(12) United States Patent
Barkelew et al.

(10) Patent No.: US 9,563,773 B2
(45) Date of Patent: Feb. 7, 2017

(54) SYSTEMS AND METHODS FOR SECURING BIOS VARIABLES

(71) Applicant: Dell Products L.P., Round Rock, TX (US)

(72) Inventors: Jonathan Bret Barkelew, Austin, TX (US); Richard M. Tonry, Austin, TX (US); Gregory S. Hudgins, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 65 days.

(21) Appl. No.: 14/190,465

(22) Filed: Feb. 26, 2014

(65) Prior Publication Data

US 2015/0242630 A1 Aug. 27, 2015

(51) Int. Cl.
*G06F 21/57* (2013.01)
*H04L 9/08* (2006.01)
*H04L 9/32* (2006.01)
*G06F 21/78* (2013.01)

(52) U.S. Cl.
CPC .............. *G06F 21/575* (2013.01); *G06F 21/78* (2013.01); *H04L 9/0822* (2013.01); *H04L 9/3226* (2013.01)

(58) Field of Classification Search
CPC ...... G06F 21/575; G06F 21/78; H04L 9/0863; H04L 9/0822; H04L 9/3226
See application file for complete search history.

(56) References Cited

U.S. PATENT DOCUMENTS

| 5,708,777 | A | * | 1/1998 | Sloan | G06F 21/31 |
| | | | | | 710/200 |
| 5,844,986 | A | * | 12/1998 | Davis | G06F 21/572 |
| | | | | | 713/187 |
| 5,892,906 | A | * | 4/1999 | Chou et al. | 726/19 |
| 6,618,810 | B1 | * | 9/2003 | Dirie | 726/27 |
| 8,127,135 | B2 | * | 2/2012 | Ibrahim | G06F 21/72 |
| | | | | | 380/259 |
| 8,429,641 | B2 | * | 4/2013 | O'Connor | G06F 15/173 |
| | | | | | 717/168 |
| 8,738,915 | B2 | * | 5/2014 | Jaber | G06F 21/572 |
| | | | | | 713/171 |
| 2003/0070099 | A1 | * | 4/2003 | Schwartz | G06F 21/31 |
| | | | | | 726/5 |

(Continued)

*Primary Examiner* — Joseph P Hirl
*Assistant Examiner* — Stephen Gundry
(74) *Attorney, Agent, or Firm* — Jackson Walker L.L.P.

(57) ABSTRACT

In accordance with embodiments of the present disclosure, a method may include generating a master cryptographic key for encrypting and decrypting the one or more variables stored in a non-transitory computer-readable medium accessible to a basic input/output system of an information handling system. The method may also include encrypting the master cryptographic key with a system password, such that the master cryptographic key as encrypted with the system password may be decrypted and used to encrypt and decrypt the one or more variables in response to entry by a user of the system password. The method may further include encrypting the master cryptographic key with an administrator password, such that the master cryptographic key as encrypted with the administrator password may be decrypted and used to encrypt and decrypt the one or more variables in response to entry by an administrator of the administrator password.

3 Claims, 3 Drawing Sheets

(56) References Cited

U.S. PATENT DOCUMENTS

| | | | |
|---|---|---|---|
| 2005/0111664 A1* | 5/2005 | Ritz et al. | 380/255 |
| 2005/0138399 A1* | 6/2005 | Cheston | G06F 21/31 713/189 |
| 2006/0200679 A1* | 9/2006 | Hawk | G06F 21/31 713/183 |
| 2007/0124798 A1* | 5/2007 | Dennis | 726/2 |
| 2007/0162733 A1* | 7/2007 | Dennis et al. | 713/1 |
| 2007/0234073 A1* | 10/2007 | Cromer | G06F 21/575 713/193 |
| 2008/0077807 A1* | 3/2008 | Hicks | G06F 21/57 713/193 |
| 2008/0082824 A1* | 4/2008 | Ibrahim | G06F 21/72 713/171 |
| 2008/0172557 A1* | 7/2008 | Crowder | G06F 21/31 713/2 |
| 2009/0313478 A1* | 12/2009 | Springfield | G06F 21/31 713/184 |
| 2010/0111309 A1* | 5/2010 | Khatri | G06F 21/602 380/283 |
| 2010/0318805 A1* | 12/2010 | Harris | G06F 21/6218 713/176 |
| 2011/0093689 A1* | 4/2011 | Pant et al. | 713/2 |
| 2011/0126023 A1* | 5/2011 | Wang et al. | 713/182 |
| 2011/0225406 A1* | 9/2011 | Nelson | G06F 11/00 713/2 |
| 2011/0225407 A1* | 9/2011 | Nelson | G06F 21/78 713/2 |
| 2011/0225428 A1* | 9/2011 | Stufflebeam, Jr. | G06F 21/72 713/189 |
| 2011/0225431 A1* | 9/2011 | Stufflebeam et al. | 713/190 |
| 2011/0258410 A1* | 10/2011 | Lambert | G06F 11/2284 711/164 |
| 2011/0307708 A1* | 12/2011 | Kritt | H04L 9/00 713/183 |
| 2012/0159041 A1* | 6/2012 | Saxena | G06F 21/79 711/103 |
| 2012/0179915 A1* | 7/2012 | Horn | G06F 21/80 713/189 |
| 2013/0007455 A1* | 1/2013 | Jaber | G06F 21/572 713/171 |
| 2013/0019281 A1* | 1/2013 | Jacobs | G06F 21/575 726/4 |
| 2013/0185564 A1* | 7/2013 | Jaber | G06F 21/57 713/176 |
| 2013/0191629 A1* | 7/2013 | Treinen et al. | 713/153 |
| 2014/0208090 A1* | 7/2014 | Anson | G06F 9/4401 713/2 |
| 2014/0359302 A1* | 12/2014 | Joshi | G06F 12/1408 713/189 |
| 2014/0359303 A1* | 12/2014 | Berke | G06F 21/73 713/189 |
| 2015/0047022 A1* | 2/2015 | von der Lippe | G06F 21/31 726/19 |
| 2015/0095631 A1* | 4/2015 | Rahardjo | G06F 21/602 713/2 |

* cited by examiner

SYSTEMS AND METHODS FOR SECURING BIOS VARIABLES

TECHNICAL FIELD

The present disclosure relates in general to information handling systems, and more particularly to securing BIOS variables.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A key component of almost every information handling system is the basic input/output system (BIOS). A BIOS may be a system, device, or apparatus configured to identify, test, and/or initialize one or more information handling resources of an information handling system, typically during boot up or power on of an information handling system. A BIOS may include boot firmware configured to be the first code executed by a processor of an information handling system when the information handling system is booted and/or powered on. As part of its initialization functionality, BIOS code may be configured to set components of the information handling system into a known state, so that one or more applications (e.g., an operating system or other application programs) stored on compatible media may be executed by a processor and given control of the information handling system and its various components.

In the course of its operation, a BIOS may store many variables from boot to boot of an information handling system. A BIOS may store such variables in a non-volatile random access memory (NVRAM) integral to or otherwise accessible to the BIOS. However, such storage method is inherently insecure, as other processes occurring before and after boot my read this storage area. Some obfuscation methods may be employed, but may be easily defeated by would-be attackers.

Ideally, confidential variables would be secured through encryption before being stored in NVRAM. The variables could then be decrypted before use by the BIOS. However, encrypting variables requires a cryptographic key that must be available at boot time. Possible ways to have such a key available at boot time are to generate the key on each boot or storing the key in a persistent manner from boot to boot. Storing the key persistently is subject to many of the same problems as storing the variables themselves: the key may be easily snooped and could therefore not be trusted with the security of encrypted variables. Generating the key on each boot is also subject to problems, as deterministic algorithms for generating a key on each boot may also be snooped from the BIOS code, and once reverse engineered, employed to replicate a key for multiple informations handling systems.

Another solution might be to use a system/user password, which is already implemented to prevent access to the system by unauthorized parties, in conjunction with a key derivation function to produce an identical key on every boot which may be used to encrypt and decrypt sensitive BIOS variables. However, in some information handling systems, an administrator password may be used to access an information handling system where a system/user password has been forgotten or is unavailable (e.g., due to hardware reallocation, employee termination, etc.). In this situation, a key derivation function applied to the administrator password would generate a different key than the system/user password, and would thus fail to decrypt the previously-encrypted variables.

SUMMARY

In accordance with the teachings of the present disclosure, the disadvantages and problems associated with securing BIOS variables may be reduced or eliminated.

In accordance with embodiments of the present disclosure, an information handling system may include a processor, a basic input/output system, a non-transitory computer readable medium, and an encryption module. The basic input/output system may include a program of instructions executable by the processor and configured to cause the processor to initialize one or more information handling resources of the information handling system. The non-transitory computer readable medium may be accessible by the basic input/output system and may be configured to store one or more variables. The encryption module may include a program of instructions executable by the processor and configured to cause the processor to: generate a master cryptographic key for encrypting and decrypting the one or more variables; encrypt the master cryptographic key with a system password, such that the master cryptographic key as encrypted with the system password may be decrypted and used to encrypt and decrypt the one or more variables in response to entry by a user of the system password; and encrypt the master cryptographic key with an administrator password, such that the master cryptographic key as encrypted with the administrator password may be decrypted and used to encrypt and decrypt the one or more variables in response to entry by an administrator of the administrator password.

In accordance with these and other embodiments of the present disclosure, a method may include generating a master cryptographic key for encrypting and decrypting the one or more variables stored in a non-transitory computer-readable medium accessible to a basic input/output system of an information handling system. The method may also include encrypting the master cryptographic key with a system password, such that the master cryptographic key as encrypted with the system password may be decrypted and used to encrypt and decrypt the one or more variables in response to entry by a user of the system password. The method may further include encrypting the master cryptographic key with an administrator password, such that the master cryptographic key as encrypted with the administrator password may be decrypted and used to encrypt and decrypt the one or more variables in response to entry by an administrator of the administrator password.

In accordance with these and other embodiments of the present disclosure, an article of manufacture may include a non-transitory computer readable medium and computer-executable instructions carried on the computer readable medium. The instructions may be readable by a processor, the instructions, when read and executed, for causing the processor to: generate a master cryptographic key for encrypting and decrypting the one or more variables stored in a non-transitory computer-readable medium accessible to a basic input/output system of an information handling system; encrypt the master cryptographic key with a system password, such that the master cryptographic key as encrypted with the system password may be decrypted and used to encrypt and decrypt the one or more variables in response to entry by a user of the system password; and encrypt the master cryptographic key with an administrator password, such that the master cryptographic key as encrypted with the administrator password may be decrypted and used to encrypt and decrypt the one or more variables in response to entry by an administrator of the administrator password.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
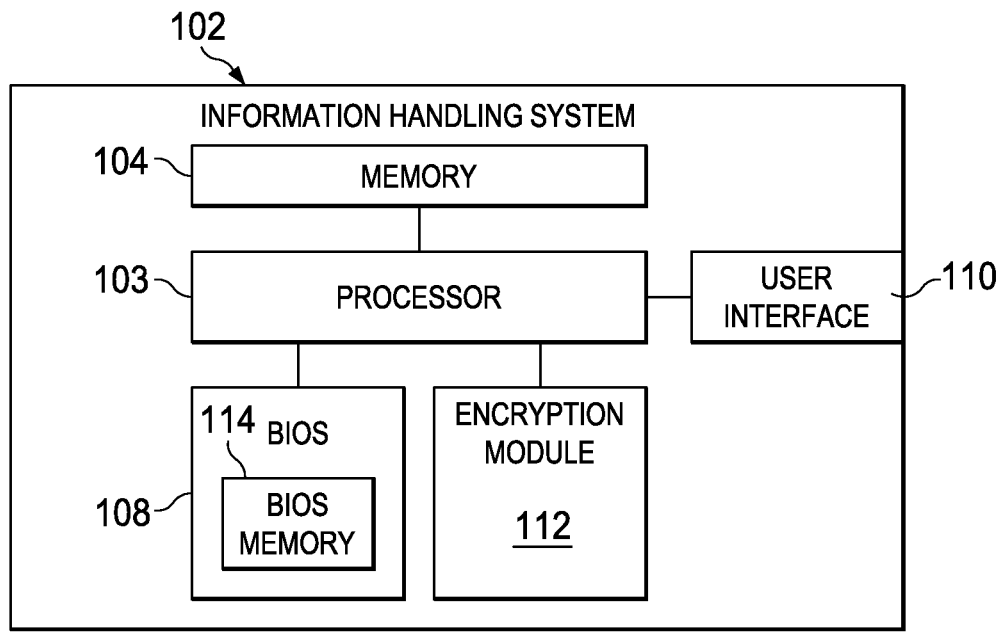
FIG. 1 illustrates a block diagram of an example information handling system, in accordance with certain embodiments of the present disclosure.

FIG. 1 illustrates a block diagram of an example information handling system 102, in accordance with certain embodiments of the present disclosure. In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, a basic input/output system (BIOS) 108 communicatively coupled to processor 103, a user interface 110 communicatively coupled to processor 103, and an encryption module 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, BIOS 108, encryption module 112 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 108 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 108 may be implemented as a program of instructions that may be read by and executed on processor 103 to carry out the functionality of BIOS 108. In these and other embodiments, BIOS 108 may comprise boot firmware configured to be the first code executed by processor 103 when information handling system 102 is booted and/or powered on. As part of its initialization functionality, code for BIOS 108 may be configured to set components of information handling system 102 into a known state, so that one or more applications (e.g., an operating system or other application programs) stored on compatible media (e.g., memory 104) may be executed by processor 103 and given control of information handling system 102.

As shown in FIG. 1, BIOS 108 may include BIOS memory 114. BIOS memory 114 may comprise a memory or other computer-readable media (e.g., NVRAM) and may store variables that may be accessed by BIOS 108 during a boot which may require persistent storage from boot to boot. As shown in FIG. 1, BIOS memory 114 may be integral to BIOS 108. However, in other embodiments, BIOS memory 114 may be separate from but accessible to BIOS 108.

User interface 110 may comprise any instrumentality or aggregation of instrumentalities by which a user may interact with information handling system 102. For example, user interface 110 may permit a user to input data and/or instructions into information handling system 102, and/or otherwise manipulate information handling system 102 and its associated components. User interface 110 may also permit information handling system 102 to communicate data to a user, e.g., by way of a display device.

Encryption module 112 may be communicatively coupled to processor 103 and may include any system, device, or apparatus configured to manage, encrypt, or decrypt variables stored in BIOS memory 114 and to manage, encrypt, or decrypt one or more cryptographic keys for encrypting and decrypting variables stored in BIOS memory 114, as described in greater detail below. In some embodiments, encryption module 112 may be implemented as a program of instructions that may be read by and executed on processor 103 to carry out the functionality of encryption module 112. In embodiments represented by FIG. 1, encryption module 112 is shown separate from BIOS 108. However, in some embodiments, encryption module 112 may be integral to BIOS 108. In these and other embodiments, encryption module 112 may comprise or be an integral part of a Trusted Platform Module, an embedded controller, and/or any other suitable component of information handling system 102.

In operation, encryption module 112 may cause variables stored in BIOS memory 114 to be protected via encryption and decryption by a master cryptographic key. In addition, encryption module 112 may operate to encrypt and decrypt the master cryptographic key with either of a system password and an administrator password, as described in greater detail below with respect to method 200.

In addition to processor 103, memory 104, BIOS 108, user interface 110, and encryption module 112, information handling system 102 may include one or more other information handling resources.

Figure 2:
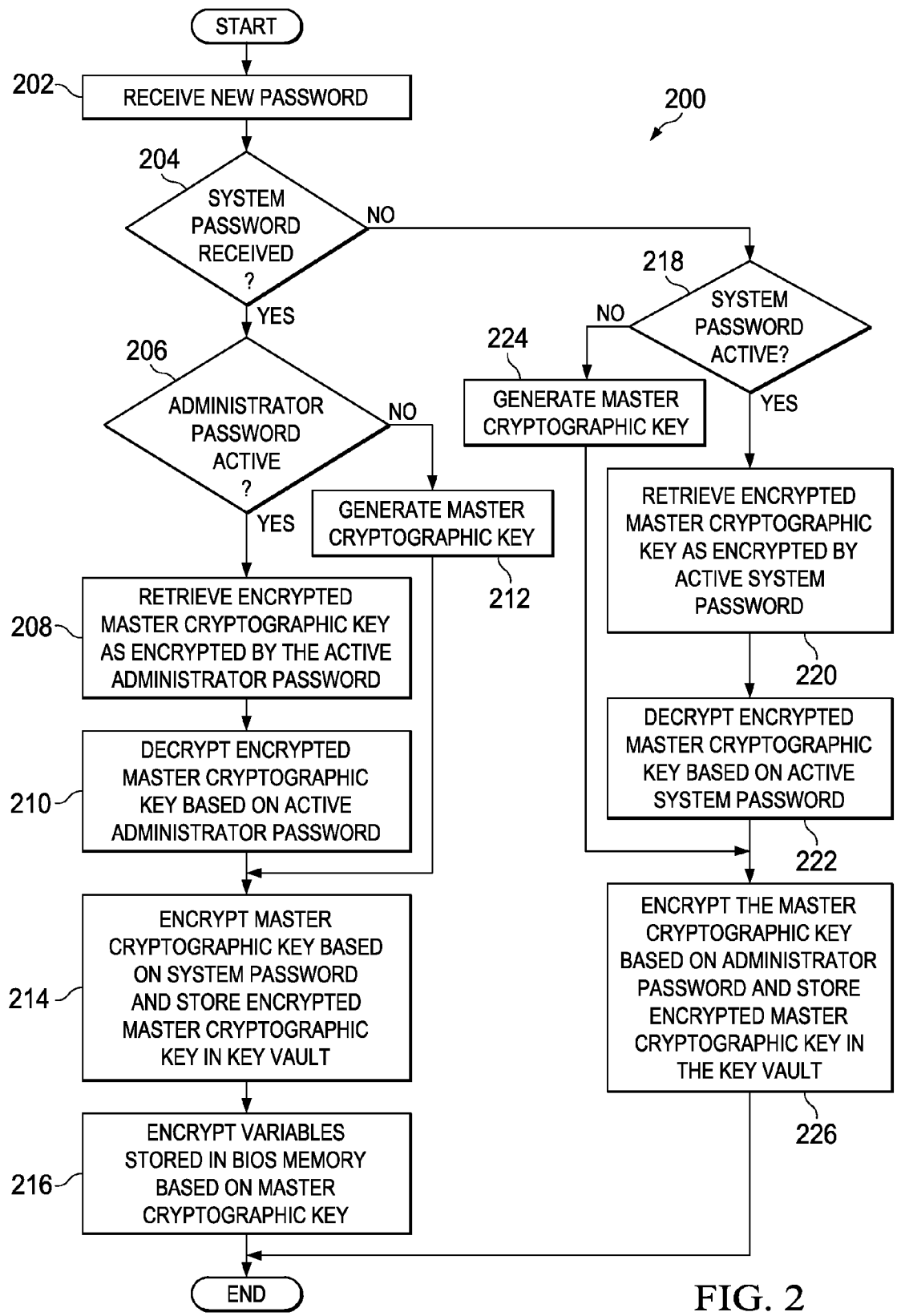
FIG. 2 illustrates a flow chart of an example method for securing BIOS variables, in accordance with certain embodiments of the present disclosure.

FIG. 2 illustrates a flow chart of an example method 200 for securing BIOS variables, in accordance with certain embodiments of the present disclosure. In some embodiments, one or more steps of method 200 may be performed by encryption module 112. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, encryption module 112 may receive either of a new system password entered by a user of information handling system 102 or a new administrator password entered by an administrator of information handling system 102. As used herein, a system password is one for authenticating a typical user of information handling system 102, and typically is associated with limited access privileges to information handling system 102. On the other hand, an administrator password is one for authenticating an administrator of information handling system 102, and is typically associated with access privileges greater than that of a system password, including, in some cases, virtually unlimited access privileges.

At step 204, encryption module 112 may determine whether the password entered at step 202 is a system password or an administrator password. If a system password, method 200 may proceed to step 206. If an administrator password, method 200 may proceed to step 218.

At step 206, in response to the received password being a new system password, encryption module 112 may determine if an administrator password is already active on information handling system 102. If an administrator password is not active, method 200 may proceed to step 212. Otherwise, if an administrator password is active on information handling system 102, method 200 may proceed to step 208.

At step 208, in response to an administrator password being active on information handling system 102, encryption module 112 may retrieve the encrypted master cryptographic key as encrypted by the active administrator password. The encrypted master cryptographic key may be retrieved from a key vault (e.g., in memory 104, BIOS memory 114, or other suitable computer-readable medium) accessible to encryption module 112.

At step 210, encryption module 112 may decrypt the encrypted master cryptographic key based on the active administrator password. After completion of step 210, method 200 may proceed to step 214.

At step 212, in response to an administrator password not being active on information handling system 102, encryption module 112 may generate a master cryptographic key. Any suitable approach may be used to generate the master cryptographic key, including random generation of the master cryptographic key.

At step 214, encryption module 112 may encrypt the master cryptographic key based on the system password and store the encrypted master cryptographic key in the key vault.

At step 216, encryption module 112 may encrypt variables stored in BIOS memory 114 based on the master cryptographic key, and store such encrypted variables in BIOS memory 114. After completion of step 216, method 200 may end.

At step 218, in response to the received password being a new administrator password, encryption module 112 may determine if a system password is already active on information handling system 102. If a system password is not active, method 200 may proceed to step 220. Otherwise, if a system password is active, method 200 may proceed to step 224.

At step 220, in response to a system password not being active, encryption module 112 may retrieve the encrypted master cryptographic key as encrypted by the active system password. The encrypted master cryptographic key may be retrieved from the key vault.

At step 222, encryption module 112 may decrypt the encrypted master cryptographic key based on the active system password. After completion of step 222, method 200 may proceed to step 226.

At step 224, in response to a system password not being active on information handling system 102, encryption module 112 may generate a master cryptographic key. Any suitable approach may be used to generate the master cryptographic key, including random generation of the master cryptographic key.

At step 226, encryption module 112 may encrypt the master cryptographic key based on the administrator password and store the encrypted master cryptographic key in the key vault. After completion of step 226, method 200 may end.

Accordingly, via method 200, encryption module 112 may encrypt the same master cryptographic key with each of the administrator password and the system password of an information handling system, and store each encrypted version of the master cryptographic key, so that the master cryptographic key may be decrypted by either of the system password or the administrator password.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Figure 3:
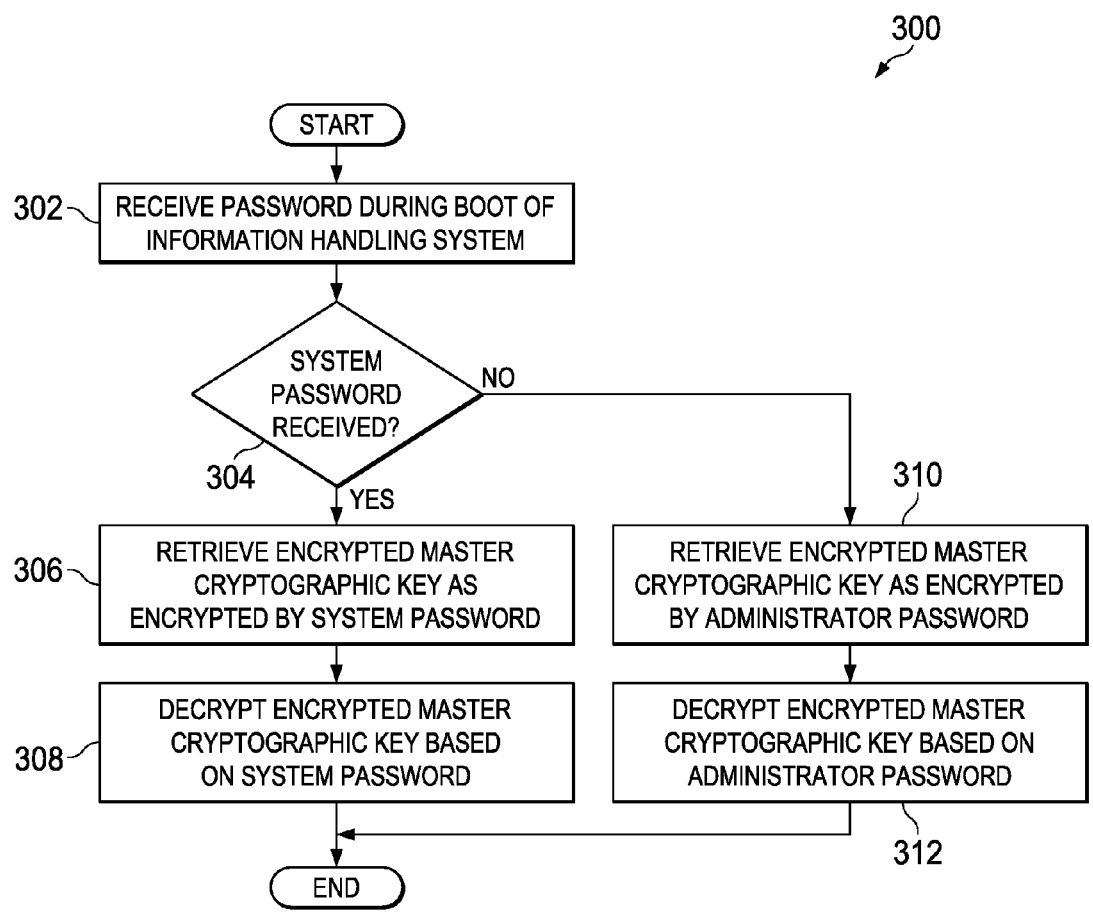
FIG. 3 illustrates a flow chart of an example method for decrypting a master cryptographic key, in accordance with certain embodiments of the present disclosure.

FIG. 3 illustrates a flow chart of an example method 300 for decrypting a master cryptographic key, in accordance with certain embodiments of the present disclosure.

In some embodiments, one or more steps of method 300 may be performed by encryption module 112. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, encryption module 112 may receive either of a system password or an administrator password from an individual logging into information handling system 102 during a boot of information handling system 102.

At step 304, encryption module 112 may determine whether the password entered at step 302 is a system password or an administrator password. If a system password, method 300 may proceed to step 306. If an administrator password, method 300 may proceed to step 310.

At step 306, in response to the received password being a system password, encryption module 112 may retrieve the encrypted master cryptographic key as encrypted by the system password. The encrypted master cryptographic key may be retrieved from the key vault.

At step 308, encryption module may decrypt the encrypted master cryptographic key based on the system password. After completion of step 308, method 300 may end.

At step 310, in response to the received password being an administrator password, encryption module 112 may retrieve the encrypted master cryptographic key as encrypted by the administrator password. The encrypted master cryptographic key may be retrieved from the key vault.

At step 312, encryption module 112 may decrypt the encrypted master cryptographic key based on the administrator password. After completion of step 312, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

Figure 4:
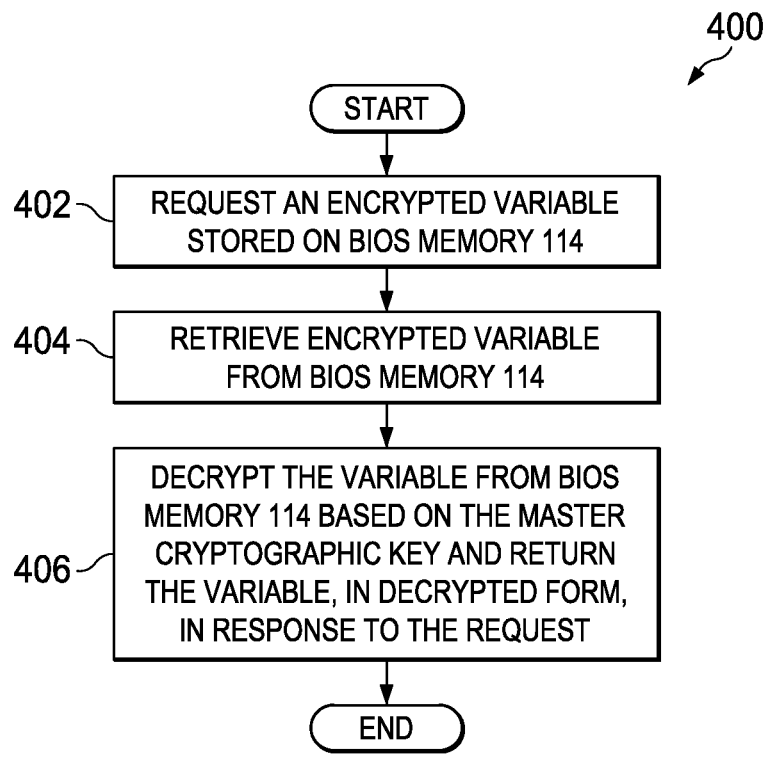
FIG. 4 illustrates a flow chart of an example method for decrypting BIOS variables, in accordance with embodiments of the present disclosure.

FIG. 4 illustrates a flow chart of an example method 400 for decrypting BIOS variables, in accordance with embodiments of the present disclosure. In some embodiments, one or more steps of method 400 may be performed by encryption module 112. According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen. In addition, method 400 will, in most embodiments, execute after method 300, so as to be able to use the master cryptographic key decrypted by method 300.

At step 402, a program of instructions executing on processor 103 (e.g., BIOS 108) may request an encrypted variable stored on BIOS memory 114. At step 404, responsive to the request, encryption module 112 may retrieve the encrypted variable from BIOS memory 114. At step 406, encryption module 112 may decrypt the variable from BIOS memory 114 based on the master cryptographic key decrypted by method 300, above, and return the variable, in decrypted form, in response to the request. After completion of step 406, method 400 may end.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system, comprising:
   a processor;
   a basic input/output system comprising a first program of instructions executable by the processor and configured to cause the processor to initialize one or more information handling resources of the information handling system;
   a non-transitory computer readable medium accessible by the basic input/output system configured to store one or more variables; and
   an encryption module comprising a second program of instructions executable by the processor and configured to cause the processor to:
   receive a new password;
   in response to receipt of the new password, determine if the new password is a system password or an administrator password;
   if the new password is the system password:
     determine whether an administrator password is active on the information handling system;
     in response to determining that the administrator password is not active:
       generate a master cryptographic key for encrypting and decrypting the one or more variables;
       encrypt or decrypt the one or more variables with the master cryptographic key; and
       encrypt the master cryptographic key based on the system password; and
     in response to determining that the administrator password is active:
       retrieve the master cryptographic key as encrypted by the administrator password;
       decrypt the master cryptographic key with the administrator password; and
       encrypt the master cryptographic key with the system password; and
   if the new password is an administrator password:
     determine whether the system password is active on the information handling system;
     in response to determining that the system password is not active:
       generate the master cryptographic key for encrypting and decrypting the one or more variables; and
       encrypt the master cryptographic key based on the administrator password; and
     in response to determining that the system password is active:
       retrieve the master cryptographic key as encrypted by the system password;
       decrypt the master cryptographic key with the system password; and
       encrypt the master cryptographic key with the administrator password.

2. A method comprising:
   receiving a new password;
   in response to receipt of the new password, determining if the new password is a system password or an administrator password;
   if the new password is the system password:
     determining whether an administrator password is active on an information handling system;
     in response to determining that the administrator password is not active:
       generating a master cryptographic key for encrypting and decrypting one or more variables of a basic input/output system;
       encrypting or decrypting the one or more variables with the master cryptographic key; and
       encrypting the master cryptographic key based on the system password; and
     in response to determining that the administrator password is active:
       retrieving the master cryptographic key as encrypted by the administrator password;
       decrypting the master cryptographic key with the administrator password; and
       encrypting the master cryptographic key with the system password; and
   if the new password is an administrator password:
     determining whether the system password is active on the information handling system;
     in response to determining that the system password is not active:
       generating the master cryptographic key for encrypting and decrypting the one or more variables; and
       encrypting the master cryptographic key based on the administrator password; and
     in response to determining that the system password is active:
       retrieving the master cryptographic key as encrypted by the system password;
       decrypting the master cryptographic key with the system password; and
   encrypting the master cryptographic key with the administrator password.

3. An article of manufacture, comprising:
   a non-transitory computer readable medium; and
   computer-executable instructions carried on the computer readable medium, the instructions readable by a processor, the instructions, when read and executed, for causing the processor to:
   receive a new password;
   in response to receipt of the new password, determine if the new password is a system password or an administrator password;
   if the new password is the system password:
     determine whether an administrator password is active on an information handling system;
     in response to determining that the administrator password is not active:

generate a master cryptographic key for encrypting and decrypting one or more variables of a basic input/output system;
encrypt or decrypt the one or more variables with the master cryptographic key; and
encrypt the master cryptographic key based on the system password; and
and
in response to determining that the administrator password is active:
retrieve the master cryptographic key as encrypted by the administrator password;
decrypt the master cryptographic key with the administrator password; and
encrypt the master cryptographic key with the system password; and
if the new password is an administrator password:

determine whether the system password is active on the information handling system;
in response to determining that the system password is not active:
generate the master cryptographic key for encrypting and decrypting the one or more variables; and
encrypt the master cryptographic key based on the administrator password; and
in response to determining that the system password is active:
retrieve the master cryptographic key as encrypted by the system password;
decrypt the master cryptographic key with the system password; and
encrypt the master cryptographic key with the administrator password.

\* \* \* \* \*